United States Patent [19]
Perches

[11] Patent Number: 4,626,668
[45] Date of Patent: Dec. 2, 1986

[54] KEYBOARD CONSTRUCTION

[76] Inventor: Martin Perches, 1801 Greenwich St., #102, San Francisco, Calif. 94123

[21] Appl. No.: 738,271

[22] Filed: May 28, 1985

[51] Int. Cl.4 .............................................. G06C 7/02
[52] U.S. Cl. ............................... 235/145 R; 235/1 D
[58] Field of Search .............. 235/145 R, 145 A, 1 D; 200/5 A; 179/100 R–100 L, 178, 179

[56] References Cited

U.S. PATENT DOCUMENTS 4,039,068  8/1977  Giorzl et al. ................ 235/145 R X
4,100,402  7/1978  Lundstrom et al. ............. 235/145 R
4,292,510  9/1981  Hild ................................ 235/145 R
4,310,753  1/1982  Fischer .......................... 235/145 R Primary Examiner—Benjamin R. Fuller

[57] ABSTRACT

To permit small, closely depressible keys, such as found on telephones and hand-held calculators, to be used by users having long fingernails, the keys are located adjacent a slot in the frame of the apparatus, or adjacent the upper edge of the apparatus. Thus, the pad of the finger contacts the top of the key and the fingernail fits into the slot or fits over the edge of the frame. Hence, the pads of the fingers depress the keys in the same manner when one is wearing long fingernails as used by those having short fingernails.

7 Claims, 6 Drawing Figures

KEYBOARD CONSTRUCTION

BACKGROUND OF THE INVENTION

1. Field of the Invention

This invention relates to a new and improved keyboard construction of the type where there are a number of closely spaced keys, such as in touchtone telephones, hand-held calculators and similar usages.

2. Description of Related Art

In some of the modifications of the invention hereinafter set forth, the keyboards themselves are substantially conventional in the arrangement of the keys in rows and columns. However, the modification of telephone instruments, calculators and the like, as hereinafter set forth, has never, so far as the inventor is aware, been known.

SUMMARY OF THE INVENTION

Users of keyboard equipment who have long fingernails encounter problems in using touchtone telephone keys, and other equipment. The pad of the finger ordinarily cannot touch the top of the key because the tip of a long fingernail touches the frame surrounding the key. Users have attempted various relatively unsatisfactory ways of circumventing the problem, such as using the tip of the fingernail to depress the key (which may result in breaking the fingernail or damaging the fingernail polish), turning the finger sideways so that the edge of the finger touches the key (which frequently results in a wrong key being punched) or gripping a pencil and using the eraser end of the pencil to punch the keys (which requires that a pencil be conveniently at hand and also prevents use of a "touch" system of depressing keys). In accordance with the present invention, the key is so placed relative to a slot or the edge of the frame of the piece of equipment that a long fingernail has sufficient clearance so that the pad of the finger can depress the key. This is accomplished in several ways, such as, by forming a groove in the frame immediately above the key in which the fingernail may fit; by forming a slot in the frame which extends from the top to bottom and thus provides clearance of the fingernail, or by modifying the keyboard so that the keys are adjacent the peripheral edge of the instrument. All of these forms of the invention are set forth in detail.

Other objects of the present invention will become apparent upon reading the following specification and referring to the accompanying drawings in which similar characters of reference represent corresponding parts in each of the several views.

Figure 2:
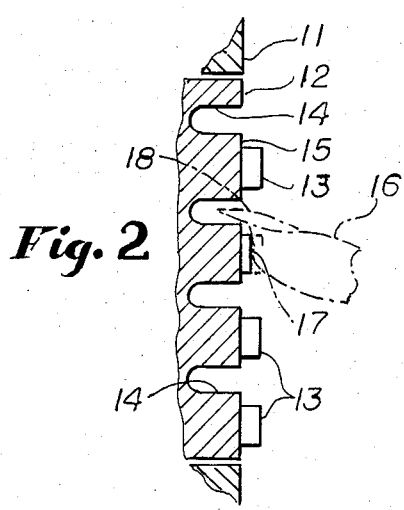
FIG. 2 is a sectional view taken along the line 2—2 of FIG. 1.
Figure 1:
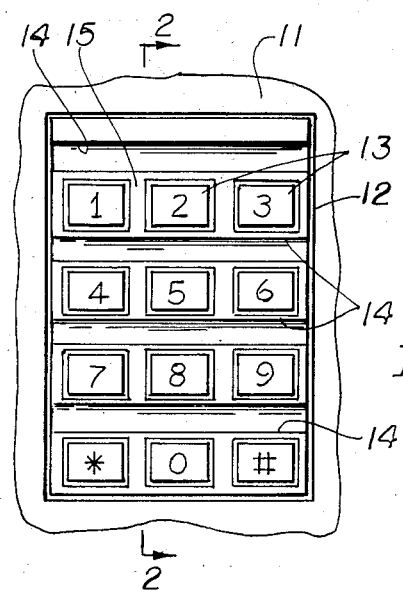
FIG. 1 is a fragmentary plan view of the keyboard of a touchtone telephone instrument with the present invention incorporated therein.

Directing attention first to the structure shown in FIGS. 1 and 2, the invention is shown incorporated in an otherwise conventional touchtone type telephone instrument which has a frame 12 apertured for the reciprocation of conventional keys 13 which are arranged in four rows of three keys each. The designators on the individual keys are in accordance with the arrangement of the standard touchtone telephone keyboard. In accordance with the present invention, a slot extends across frame 12 immediately above each row of keys 13. The slot 14 extends below the top surface 15 of frame 12 a sufficient depth to accommodate a long fingernail. Thus, as shown in FIG. 2, finger 16 has a pad 17 beyond which extends a fingernail 18 the slot 14 is sufficiently deep so that the nail 18 may extend therein a sufficient depth so that the pad 17 engages the top surface of the key 13 and has sufficient additional depth so that the pad may depress the key 13.

Thus, in accordance with FIGS. 1 and 2, the user's fingernails 18 do not interfere with the pad 17 of the finger 16 engaging the top surfaces of any key 13 and depressing the same in the same fashion as a user with short fingernails would normally use the instrument. It will be understood that the same principle of a slot 14 across the top of each row of keys 13 may be used in other instruments, such as calculators, either stationary or hand-held, typewriters and the like. Further, the particular arrangement of keys shown is that of a standard telephone, the invention may be incorporated in other arrangements.

Figure 3:
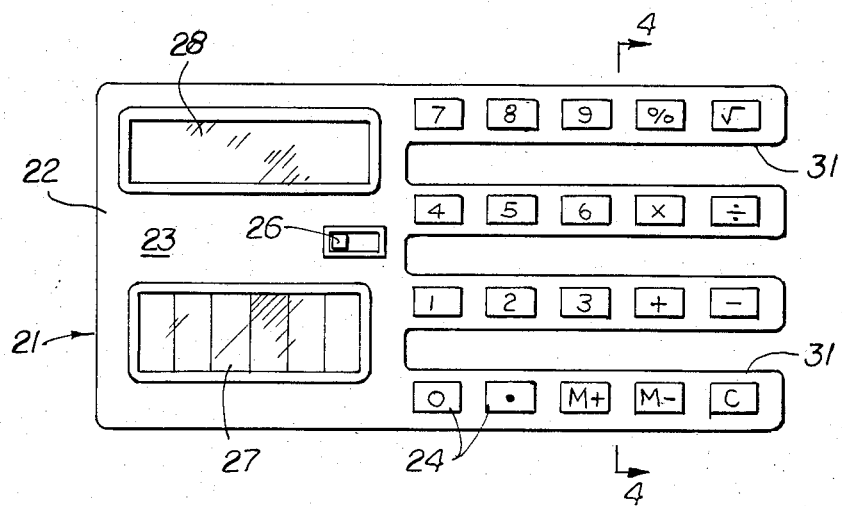
FIG. 3 is a plan view of a hand-held calculator modified in accordance with the present invention.
Figure 4:
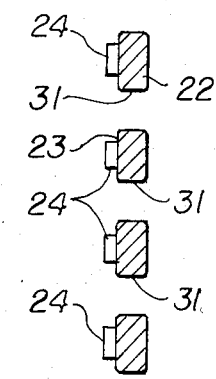
FIG. 4 is a sectional view taken substantially along the line 4—4 of FIG. 3.

Directing attention now to FIGS. 3 and 4, a hand-held calculator 21 is shown. It will be understood that the arrangement of keys of the calculator 21 is subject to wide variation. The calculator 21 has a frame 22 formed with a top surface 23 through which extend reciprocable keys 24. The arrangement and positioning of the keys 24 is subject to wide variation. Other features of the particular calculator 21 shown in FIGS. 3 and 4 include an OFF and ON switch 26, a solar cell 27 and a numeric display 28.

The modification of a standard calculator frame which is illustrated in FIGS. 3 and 4 is the provision of throughgoing slots 31, which extend from the top surface 23 to the bottom surface opposite the top surface immediately above the rows of keys below the top row. As to the top row, the keys 24 thereof are located close to the upper edge of frame 22.

In using the calculator shown in FIGS. 3 and 4, the long fingernails of the user extend into the slots 31 or extend out over the top edge of the frame 22. Thus, the pads of the fingers may engage any of the keys without the fingernails interferring.

Figure 5:
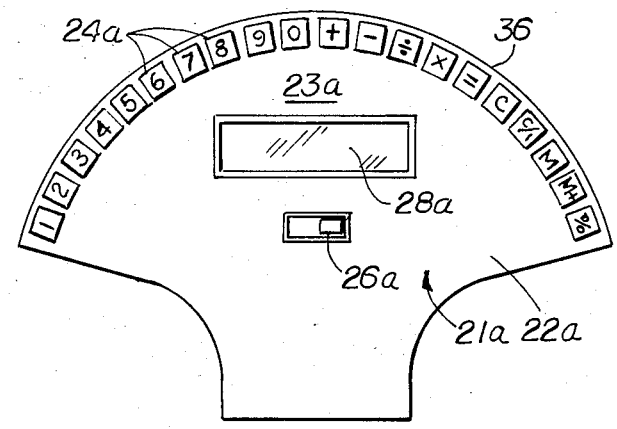
FIG. 5 is a plan view of a further modified hand-held calculator.

FIG. 5 shows a still further modified calculator 21a which has an arcuate peripheral edge 36 near which are located keys 24a. In this form of the invention, the fingernails of the user extend out beyond the edge 36 so that the pads of the fingers may contact any of the keys 24a as desired.

Figure 6:
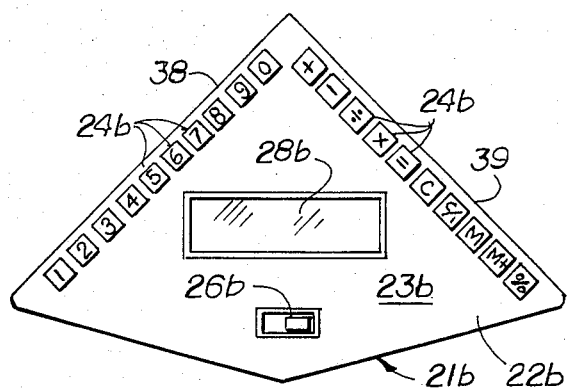
FIG. 6 is a plan view of still another modified calculator.

FIG. 6 shows a modification of the structure of FIG. 5 wherein, instead of the edge 36 being arcuate, the frame 22b has an angular periphery consisting of a first stretch 38 and a second stretch 39. The stretches 38 and 39 are shown disposed at a 90° angle. However, it will be understood, that the angle may be modified.

In other respects the calculators 21a, 21b of FIGS. 5 and 6 are similar to that shown in FIG. 3 at the same reference numerals followed by the subscripts "a" and "b", respectively, are used to designate corresponding elements.

The provision of clearance means for long fingernails shown in the accompanying drawings and the foregoing written description may be applied to other equipment besides telephones and calculators.

What is claimed is:

1. A device comprising a frame, having a top surface, at least one opening in said frame, at least one key reciprocable in said opening in said frame and having a first position with the upper ends of said key above said top surface and a depressed second position, said key being shaped to substantially fill said opening, and having a top surface substantially the same size as said opening, said frame being formed with a slot immediately adjacent said key, the depth of said slot being sufficient to receive a long fingernail so that the pad of the finger may touch said upper end to depress said key with the long fingernail thereof in said slot.

2. A device according to claim 1 in which said slot extends all the way through said frame from said top surface to the bottom surface opposite said top surface.

3. A device according to claim 1 in which said frame is an exposed portion of a touch-tone telephone, said device comprising an array of twelve keys in four rows of three keys each, said frame being formed with a plurality of said slots, each said slot extending across said frame immediately adjacent each said row of said keys.

4. A device according to claim 1 in which said frame is the exposed surface of a calculator having a plurality of rows, each having a plurality of keys, said frame being formed with a plurality of said slots, each said slot extending across said frame immediately adjacent each said row of said keys.

5. A device comprising a frame having a top surface having a peripheral edge and a plurality of openings adjacent said edge, a plurality of keys reciprocable in said openings in said frame having a first position with the upper ends of said keys above said top surface and a depressed second position, said keys being spaced apart vicinal said peripheral edge, said keys being shaped to substantially fill said openings and having top surfaces substantially the same size as said openings, whereby the pads of the fingers may engage said upper ends to depress said keys with long fingernails extending beyond said peripheral edge.

6. A device according to claim 5 in which said peripheral edge is arcuate.

7. A device according to claim 5 in which said peripheral edge comprises two angularly related stretches.

* * * * *